United States Patent Office 3,468,954
Patented Sept. 23, 1969

3,468,954
STABILIZED DINITROSO-PENTAMETHYLENE
TETRAMINE
Yvon Gilbert Marc Conseiller, Paris, and Andre Jean
Arthur Quiquempois, Nogent sur Marne, France, assignors to Rhone-Poulenc S.A., Paris, France, a French body corporate
No Drawing. Filed Mar. 24, 1966, Ser. No. 536,990
Claims priority, application France, Mar. 26, 1965, 10,908
Int. Cl. C07c 87/20
U.S. Cl. 260—583        3 Claims

ABSTRACT OF THE DISCLOSURE

Hydrated borax is an effective stabilizer for dinitrosopentamethylene tetramine against the effects of acids and heat.

The present invention provides stabilised dinitrosopentamethylene tetramine (referred to below as D.N.P.T.), of low susceptibility to decomposition by acids and by heat.

D.N.P.T. is a blowing agent widely used in the manufacture of cellular or microcellular articles based on natural rubber, synthetic elastomers and various plastics, because of its excellent general properties, and also because it is easy to obtain. Nevertheless it is not entirely satisfactory because it easily decomposes, although it is, of course, this ease of decomposition which is made use of in making the cellular articles.

D.N.P.T. is sensitive to mineral and organic acids, which decompose it rapidly, causing it to ignite, and this property is important since some mixtures based on elastomers may contain organic acids. It is also highly inflammable and, once combustion has been started, it propagates itself at high speed. For these reasons, the preparation and use of D.N.P.T. are not without danger.

Attempts have been made to mitigate the disadvantages inherent in this blowing agent by providing users with compositions highly diluted with various additives, e.g. mixtures containing 60% of D.N.P.T. and 40% of an inert additive of the silica type. Mixtures have also been made which contain, besides the D.N.P.T., mineral salts such as alkaline earth carbonates, particularly calcium and magnesium carbonates and their mixtures, and salts such as hydrated magnesium sulphate and phosphate. Such additives limit to a certain extent the sensitivity of D.N.P.T. to acids but they are completely ineffective in reducing the combustibility of D.N.P.T. and the speed of flame propagation through it.

This invention provides a new way of limiting the sensitivity of D.N.P.T. to acids and to flames, and, more specifically, compositions comprising D.N.P.T. and a stabilizing amount of hydrated borax ($Na_2B_4O_7 \cdot 10H_2O$). Such compositions have considerably less sensitivity to contact with acids and to the action of heat than D.N.P.T. itself, but the blowing power of the latter is not reduced at the usual temperatures at which it is used as a blowing agent. D.N.P.T./borax mixtures are furthermore entirely compatible with the preparation of various elastomers.

The stability of D.N.P.T. is significantly improved even by the incorporation of 5 parts by weight of hydrated borax per 100 parts by weight of D.N.P.T. Suitable ratios may vary within rather wide limits, but generally proportions corresponding to 15–30 parts by weight of hydrated borax per 100 parts by weight of D.N.P.T. are very suitable. While higher proportions are rarely advantageous, it is possible, in special cases, to increase the ratio of hydrated borax beyond that indicated above, and if the ultimate use of the mixture is in a composition based on rubber, it is no disadvantage if the D.N.P.T. is mixed with a relatively large amount of borax, e.g. an equal weight of hydrated borax. However, such large amounts of borax are not necessary for effective stabilisation of D.N.P.T.

The hydrated borax may be added to dry D.N.P.T., or to the damp product obtained by manufacture before it is dried, it being essential that the borax is not dehydrated, i.e. that it is not heated to a temperaure above 60° C.

The compositions may optionally contain anti-dusting agents and antistatic agents, if desired.

The following examples illustrate the invention.

EXAMPLE I

D.N.P.T. is prepared by a known method, e.g. by nitrosating hexamethylene tetramine with nitrous acid or a mixture of alkali metal nitrite and a strong acid in an aqueous medium. The product obtained is filtered off and washed, and finely ground hydrated borax is then incorporated in it while it is being dried under conditions such that the borax cannot reach a temperature in excess of 60° C. The borax used consists of particles of size less than 80 microns. Four operations are carried out in this way, the proportions of boray being 10, 20, 30 and 40 parts per 100 parts of D.N.P.T. respectively.

EXAMPLE II

The contact stability of a composition obtained in the manner described in Example I was compared with that of unstabilised D.N.P.T., D.N.P.T. stabilised with a mixture of calcium and magnesium carbonates, and D.N.P.T. mixed with anhydrous borax.

The test used consists of placing 3 grams of the composition tested in a 20 ml. dish. The composition is packed down gently at the bottom of the dish so as to obtain a level surface, in the centre of which a small hollow is made. One drop (0.05 ml.) of 35% hydrochloric acid (35 g. of HCl per 100 g. of solution) is poured into the hollow with a pipette. Three results are possible: (A) spontaneous ignition takes place; (B) the whole of the composition decomposes without burning; and (C) the decomposition of the composition ceases spontaneously before complete decomposition has taken place. The experiment is repeated 5 times and the number of times that results A, B or C are obtained is noted. The compositions tested, and the results obtained, are shown in the table below:

| D.N.P.T. | Stabiliser | | A | B | C |
| --- | --- | --- | --- | --- | --- |
| | Type | Quantity | | | |
| Pure | | 0 | 5 | 0 | 0 |
| 100 parts | Calcium carbonate plus magnesium carbonate | 20 parts | 0 | 0 | 5 |
| Do | Anhydrous borax | do | 0 | 5 | 0 |
| Do | Hydrated borax | do | 0 | 0 | 5 |

EXAMPLE III

The combustibility and speed of flame propagation of compositions of the invention and comparative compositions were measured. For this, 40 grams of the composition were distributed uniformly in an aluminium angle section 50 cm. long and 2.5 cm. deep. The angle section was placed on a support, and the composition ignited at one end. The following observations were made: height of flame; time taken by the flame to traverse the 50 cm.; and time required for total combustion. The results of the observations are recorded in the table below:

| Composition | Height of flame, cm. | Speed of propagation (time for traversing 50 cm.) | Duration of combustion |
|---|---|---|---|
| D.N.P.T. without stabiliser | 50 | 55 sec | 1′20 sec. |
| Mixture of 20 parts of calcium carbonate and magnesium carbonate per 100 parts of D.N.P.T. | 35 | 55 sec | 2′05 sec. |
| Mixture of DNPT and hydrated borax: D.N.P.T. / Hydrated borax | | | |
| 100 parts / 20 parts | 15 | 4′10 sec | 5′15 sec. |
| Do / 30 parts | 10 | 5′30 sec | 6′40 sec. |
| Do / 40 parts | 3 | 10′ | 12′15 sec |
| Do / 50 parts | 3 | 12′45 sec | 14′50 sec. |

This shows that hydrated borax considerably reduces the speed of flame propagation.

EXAMPLE IV

Two mixtures having the following composition are prepared by the usual mixing techniques:

| | Parts by wt. |
|---|---|
| Smoked sheet | 60 |
| Styrene-butadiene copolymer, extended with oil [1] | 55 |
| Zinc oxide | 5 |
| Stearic acid | 2 |
| Chalk | 50 |
| Kaolin | 50 |
| Hydrocarbon mineral oil | 10 |
| Dithio-bis-benzanilide | 0.5 |
| Benzothiazyl disulphide | 1.12 |
| Diphenylguanidine | 0.56 |
| Hexamethylene tetramine | 0.32 |
| Sulphur | 2 |
| Blowing agent (see below) | 1.25 |

[1] A copolymer containing about 23% styrene, obtained by cold polymerization, and extended with about 37 parts of oil, a naphthene-type oil per 100 parts of copolymer. The mixtures are vulcanised in pressure moulds at 153° C., the operation being carried out between cloths impregnated with a silicone emulsion. The moulds are half filled so as to obtain a degree of blowing of 100%. After vulcanisation and removal from the mould, the samples obtained are examined. The observations made are given in the table below:

| Blowing agent | Surface appearance | Bulk appearance | Degree of blowing, percent | Apparent mean density |
|---|---|---|---|---|
| Pure D.N.P.T. | Very satisfactory | Very regular small cells | 100 | 0.69 |
| Composition of the invention, D.N.P.T., 100 parts by weight. Hydrated borax: 20 parts by weight. | do | do | 100 | 0.69 |

This shows that the stabiliser does not alter the behaviour of D.N.P.T. as a blowing agent.

We claim:

1. A composition consisting essentially of dinitroso-pentamethylene tetramine and an amount of hydrated borax up to the weight of the dinitroso-pentamethylene tetramine and sufficient to stabilize the said dinotroso-pentamethylene tetramine to decomposition by acids and by heat.

2. A composition according to claim 1 consisting essentially of 15 to 30 parts by weight of hydrated borax per 100 parts by weight of dinitroso-pentamethylene tetramine.

3. A composition according to claim 1 consisting essentially of 5 to 100 parts by weight of hydrated borax per 100 parts by weight of dinitroso-pentamethylene tetramine.

No references cited.

CHARLES B. PARKER, Primary Examiner

R. L. RAYMOND, Assistant Examiner